United States Patent [19]
Reuter et al.

[11] 3,894,971

[45] July 15, 1975

[54] OXIDATION CATALYSTS

[75] Inventors: Peter Reuter, Bad Duerkheim; Friedrich Wirth, Ludwigshafen, both of Germany

[73] Assignee: Badische Anilin- & Soda-Fabrik Aktiengesellschaft, Ludwigshafen (Rhine), Germany

[22] Filed: Mar. 15, 1973

[21] Appl. No.: 341,532

[30] Foreign Application Priority Data
Mar. 17, 1972 Germany............................ 2212964

[52] U.S. Cl. ............... 252/437; 260/687; 260/343.3
[51] Int. Cl. ............................................. B01j 27/14
[58] Field of Search ..................................... 252/437

[56] References Cited
UNITED STATES PATENTS

| | | | |
|---|---|---|---|
| 3,086,026 | 4/1963 | Wiebusch | 252/437 X |
| 3,238,253 | 3/1966 | Kerr | 252/437 X |
| 3,288,721 | 11/1966 | Kerr | 252/437 X |
| 3,352,905 | 11/1967 | Kerr | 252/437 X |
| 3,379,651 | 4/1968 | Hargis et al. | 252/437 |
| 3,485,877 | 12/1969 | Hargis et al. | 252/437 X |
| 3,541,143 | 11/1970 | Nakano et al. | 252/437 X |
| 3,654,354 | 4/1972 | Blanc | 252/437 X |
| 3,668,147 | 6/1972 | Yoshino et al. | 252/437 X |

*Primary Examiner*—Paul F. Shaver
*Attorney, Agent, or Firm*—Johnston, Keil, Thompson & Shurtleff

[57] ABSTRACT

A catalyst for the oxidation of aromatic or unsaturated aliphatic hydrocarbons which contains in the active material from 60 to 99 percent by weight of titanium dioxide and/or zirconium dioxide, from 1 to 40 percent by weight of vanadium pentoxide and up to 6 percent by weight of combined phosphorus, and which contains from 0 to 0.3 percent by weight of phosphorus in the outer layer and more than 0.3 percent up to 6 percent by weight of phosphorus in the remaining catalytic material.

9 Claims, No Drawings

OXIDATION CATALYSTS

Catalysts containing titanium dioxide and vanadium pentoxide are known as oxidation catalysts for the production of carboxylic acids and anhydrides from aromatic or unsaturated aliphatic hydrocarbons. Among these catalysts the supported catalysts described in French Patent No. 1,480,078 for example in which in inert carrier material is coated with the catalytic material have achieved commercial importance for the continuous production of phthalic anhydride from o-xylene or naphthalene. In order to improve the life of the catalysts and the yields achieved therewith, phosphorus compounds are added to the catalytic material (see Belgian Patent No. 737,587).

In order to avoid loss of yield and damage to the catalyst, these catalysts containing phosphorus are not exposed to maximum hydrocarbon loadings until after some months.

We have now found a new catalyst for the oxidation of aromatic or unsaturated aliphatic hydrocarbons in which the said precaution is not necessary. The new and advantageous catalyst which consists of or contains a catalytically active material which contains from 60 to 99 percent by weight of titanium dioxide and/or zirconium dioxide, from 1 to 40 percent by weight of vanadium pentoxide and (based on the tool amount of titanium dioxide, zirconium dioxide and vanadium pentoxide) up to 6 percent by weight of phosphorus in the form of a phosphorus compound, is characterized by the fact that the catalytic material of the outer layer of the catalyst contains from 0 to 0.3 percent of phosphorus and the remainder of the catalytic material contains more than 0.3 percent up to 6 percent by weight of phosphorus.

The catalytic material, which consists essentially of from 1 to 40 percent, particularly from 1 to 15 percent, by weight of vanadium pentoxide and from 60 to 99 percent, particularly from 85 to 99 percent by weight of titanium dioxide and/or zirconium dioxide, contains (based on the total amount of vanadium pentoxide and titanium dioxide and/or zirconium dioxide) up to 6 percent by weight of phosphorus in the form of an oxygen-containing phosphorus compound such as phosphorus pentoxide or a phosphate. The catalytically active material may also contain a small amount, for example up to 10 percent by weight, of another oxide such as an oxide of one of the metals aluminum, lithium, niobium, tin, antimony, hafnium, chromium, tungsten or molybdenum. An addition of for example up to 5 percent by weight of an alkali metal salt or alkaline earth metal salt such as an alkali metal phosphate or alkali metal sulfate is also possible.

The titanium dioxide is advantageously present in the new catalysts as anatase having an internal surface area of from 5 to 30, particularly from 5 to 20, $m^2/g$. The internal surface area of the zirconium dioxide should be from 2 to 25, particularly from 2 to 20, $m^2/g$. These oxides are used in finely divided form.

The new phosphorus-containing catalysts contain as an essential feature from 0 to not more than 0.3 percent by weight, preferably up to not more than 0.25 percent by weight, of phosphorus, in the outer layer of the catalytically active material, and in the active material beneath this is a larger amount of phosphorus up to not more than 6 percent by weight, preferably from 0.35 to 6 percent by weight of phosphorus, in each case based on the total amount of vanadium pentoxide, titanium dioxide and zirconium dioxide.

The preferred catalysts of this invention are those which consist of an inert carrier and the catalytically active material applied to the carrier in a thin layer. They contain as carrier a material of the lowest possible porosity which preferably has an internal surface area of from 0 to 3 $m^2/g$ such as quartz, porcelain, fused aluminum oxide, silicon carbide and fused or sintered silicates. The carrier is advantageously in the form of granules, pellets or rings and particularly in spherical form, the spheres conveniently having a diameter of from 4 to 12 mm.

The active material including the outer layer containing little or no phosphorus is conveniently present on the carrier in an amount of from 2 to 58 percent, preferably from 3 to 33 percent, by weight based on the supported catalyst. The vandium pentoxide content of the supported catalyst is preferably from 0.05 to 3 percent by weight. The thickness of the entire catalytically active material is from about 0.02 to 2 mm. The outer layer containing little or no phosphorus preferably makes up not more than half and particularly from one third to one tenth of the active material. Its thickness is within the limits from about 0.01 to about 1 mm.

The ratio of the amount of vanadium pentoxide to titanium dioxide and/or zirconium dioxide may be the same as in the inner layer or may be different from it. The percentage proportion of vanadium pentoxide in the inner layer is preferably greater than in the outer layer. For example an inner layer with from 60 to 94 percent by weight of titanium dioxide and/or zirconium dioxide, from 6 to 40 percent by weight of vanadium pentoxide and 0.3 to 6 percent by weight of phosphorus (based on the total amount of titanium dioxide and/or zirconium dioxide and vanadium pentoxide) and an outer layer with from 85 to 99 percent by weight of titanium dioxide and/or zirconium dioxide, from 1 to 15 percent by weight of vanadium pentoxide and 0 to 0.3 percent by weight of phosphorus are advantageous.

The number of layers of active material on the carrier is not limited to two. The new catalysts may also contain three or more layers of the catalytically active material. For example a catalyst having three active layers may have the following composition:

Innermost layer: from 1 to 10 percent by weight of active material based on the supported catalyst with the following composition: from 60 to 94 percent by weight of titanium dioxide and/or zirconium dioxide, from 6 to 40 percent by weight of vanadium pentoxide and from 0.35 to 4.0 percent by weight of phosphorus;

middle layer: from 1 to 15 percent by weight of active material based on the supported catalyst with the composition: from 80 to 94 percent by weight of titanium dioxide and/or zirconium dioxide, from 6 to 20 percent by weight of vanadium pentoxide and from 0.35 to 2.0 percent by weight of phosphorus, the content of phosphorus being less than in the innermost layer;

outer layer: from 1 to 12 percent by weight of active material based on the supported catalyst with the composition: from 85 to 99 percent by weight of titanium dioxide and/or zirconium dioxide, from 1 to 15 percent by weight of vanadium pentoxide and from 0 to 0.3 percent by weight of phosphorus. The phosphorus content in each case is based on the total amount of titanium dioxide, zirconium dioxide and vanadium pentoxide.

The catalysts of this invention may also consist exclusively of catalytically active material and be prepared by shaping the catalytic material.

Supported catalysts are prepared for example by spraying catalytic material onto the carrier. A solution or suspension of a vanadium compound and a phosphorus compound is conveniently made into a paste with finely divided anatase and/or zirconium dioxide and the paste sprayed onto the carrier (preheated to 200° to 450°C) in a coating drum. Subsequent heating of the catalyst to 400° to 500°C may be advantageous. Examples of suitable vanadium compounds are: vanadyl oxalate, vanadyl formate, vanadyl tartrate, ammonium vanadate or vanadium pentoxide and examples of suitable phosphorus compounds are: alkali metal phosphates, ammonium phosphates, the corresponding metaphosphates and pyrophosphates and alkaline earth metal phosphates or phosphoric acid or an ester of phosphoric acid. The individual layers are produced by separate application of the respective materials in the desired sequence.

The new catalysts are suitable for example for the production of phthalic anhydride by air oxidation of o-xylene or naphthalene, for the production of maleic anhydride by air oxidation of benzene or unsaturated aliphatic $C_4$-hydrocarbons, for the production of pyromellitic anhydride by air oxidation of durene or other 1,2,4,5-tetralkylbenzenes, for the production of naphthalic acid from acenaphthene, for the production of quinones by air oxidation of naphthalene into naphthoquinone or of anthracene or substituted indans into anthraquinone. For the production of phthalic anhydride the new catalyst may be used for example in the same way as the catalyst disclosed in French Patent No. 1,480,078. It is possible to load the catalyst a short time after startup with the full load of 40 g of o-xylene or naphthalene per 1000 liters of air without damaging it.

The following Examples illustrate the invention.

EXAMPLE 1

2500 g of steatite spheres having a diameter of 6 mm are heated to 300°C in a coating drum and sprayed with an aqueous suspension consisting of 200 g of anatase having an internal surface area of 11 $m^2/g$, 65 g of formamide, 400 g of water, 28.7 g of vanadyl oxalate (equivalent to 12.8 g of $V_2O_5$) and 3.55 g of ammonium dihydrogen phosphate (equivalent to 2.9 g of $PO_4^{---}$) until the proportion of active material in the supported catalyst is 4 percent by weight. The active material of the catalyst contains 94% by weight of $TiO_2$, 6 percent by weight of $V_2O_5$, and 0.45% by weight of phorphorus (as phosphate), based on the total of $TiO_2 + V_2O_5$.

At the same temperature a suspension consisting of 100 g of anatase having an internal surface area of 11 $m^2/g$, 32.5 g of formamide, 200 g of water, 14.35 g of vanadyl oxalate (equivalent to 6.4 g of $V_2O_5$) and 0.98 g of ammonium hydrogen phosphate (equivalent to 0.81 g of $PO_4^{---}$) is sprayed on until the proportion of the whole of the active material on the supported catalyst amounts to 6 percent by weight. The coating contains 6 percent by weight of $V_2O_5$, 94 percent by weight of $TiO_2$ and 0.25 percent by weight of phosphorus based on the total of $TiO_2 + V_2O_5$.

The catalyst is introduced into a tube having a diameter of 25 mm and a length of 3 meters which is surrounded by a bath of a salt. 4000 liters of air per hour is passed through the catalyst bed. Within twenty-four hours the loading of the air with o-xylene of 98 percent purity can be increased to 40 g of o-xylene per cubic meter (STP) of air. At a salt bath temperature of 400°C the maximum temperature in the catalyst bed is only from 470° to 480°C. Pure phthalic anhydride is obtained in a yield of 111 percent by weight.

EXAMPLE 2

2500 g of steatite spheres having a diameter of 6 mm are heated to 300°C in a coating drum and sprayed with a suspension consisting of 250 g of anatase having an internal surface area of 11 $m^2/g$, 81 g of formamide, 500 g of water, 35.9 g of vanadyl oxalate (equivalent to 16 g of $V_2O_5$) and 4.44 g of ammonium dihydrogen phosphate (equivalent to 3.66 g of $PO_4^{---}$) until the proportion of active material on the supported catalyst is 5% by weight. The active material contains 94 percent by weight of $TiO_2$, 6% by weight of $V_2O_5$ and 0.45 percent by weight of phosphorus as phosphate, based on the total of $TiO_2 + V_2O_5$.

An aqueous suspension consisting of 50 g of anatase having an internal surface area of 11 $m^2/g$, 16.2 g of formamide, 100 g of water and 7.16 g of vanadyl oxalate (equivalent to 3.2 g of $V_2O_5$) is then sprayed on until the total amount of active material on the supported catalyst is 6 percent by weight. The coating contains 94 percent by weight of $TiO_2$ and 6 percent by weight of $V_2O_5$ but no phosphorus.

When o-xylene of 98% purity is reacted in the presence of this catalyst as described in Example 1 the loading of the air with o-xylene can be raised within twenty-four hours to 40 g of o-xylene per cubic meter (STP) of air. At a salt bath temperature of 398°C the maximum temperature in the catalyst bed does not exceed 480°C. Pure phthalic anhydride is obtained in a yield of 110% by weight.

EXAMPLE 3

2500 g of steatite spheres having a diameter of 6 mm are heated to 300°C in a coating drum and sprayed with an aqueous suspension consisting of 250 g of anatase having an internal surface area of 11 $m^2/g$. 81 g of formamide, 500 g of water, 42.2 g of vanadyl oxalate (equivalent to 19 g of $V_2O_5$) and 5.45 g of ammonium dihydrogen phosphate (equivalent to 4.5 g of $PO_4^{---}$) until the proportion of active material on the supported catalyst is 5 percent by weight. The active material of this layer contains 93 percent by weight of $TiO_2$, 7 percent by weight of $V_2O_5$ and 0.55 percent by weight of phosphorus as phosphate, based on the total of $TiO_2 + V_2O_5$.

At the same temperature a suspension consisting of 100 g of anatase having an internal surface area of 11 $m^2/g$, 32.5 g of formamide, 200 g of water, 14.35 g of vanadyl oxalate (equivalent to 6.4 g of $V_2O_5$) and 0.6 g of ammonium dihydrogen phosphate (equivalent to 0.49 g of $PO_4^{---}$) is sprayed on until the proportion of the whole of the active material on the supported catalyst is 7 percent by weight. The outer layer of active material contains 6 percent by weight of $V_2O_5$, 94 percent by weight of $TiO_2$ and 0.15% by weight of phosphorus, based on the total of $TiO_2 + V_2O_5$.

When o-xylene of 98 percent purity is reacted as described in Example 1 in the presence of this catalyst the loading of the air with o-xylene may be increased to 40 g of o-xylene per cubic meter (STP) within thirty hours. At a salt bath temperature of 398°C the maximum temperature in the catalyst bed does not exceed 480°C. Pure phthalic anhydride is obtained in a yield of 111% by weight.

EXAMPLE 4

2500 g of steatite spheres having a diameter of 6 mm are heated to 300°C in a coating drum and sprayed with an aqueous suspension consisting of 150 g of anatase with an internal surface area of 11 m$^2$/g, 49 g of formamide, 300 g of water, 33.1 g of vanadyl oxalate (equivalent to 14.8 g of V$_2$O$_5$) and 4.89 g of ammonium dihydrogen phosphate (equivalent to 4.07 g of PO$_4$ $^{(---)}$) until the proportion of the active material on the supported catalyst is 3 percent by weight. The active material of this layer contains 9 percent by weight of V$_2$O$_5$, 91% by weight of TiO$_2$ and 0.8 percent by weight of phosphorus (as phosphate), based on the sum of TiO$_2$ + V$_2$O$_5$.

Then at 300°C a suspension consisting of 100 g of anatase, 32.5 g of formamide, 200 g of water, 14.35 g of a vanadyl oxalate (equilvalent to 6.4 g of V$_2$O$_5$) and 1.78 g of ammonium dihydrogen phosphate (equivalent to 1.47 g of PO$_4$ $^{(---)}$) is sprayed on until the proportion of total active material in the supported catalyst is 5% by weight. The layer thus produced of active material contains 6% by weight of V$_2$O$_5$, 94% by weight of TiO$_2$ and 0.45% by weight of phosphorus (as phosphate) based on the sum of TiO$_2$ + V$_2$O$_5$.

An outer layer devoid of phosphorus is applied to this catalyst by spraying on a suspension consisting of 100 g of anatase having an internal surface of 11 m$^2$/g, 32.5 g of formamide, 200 g of water, 14.35 g of vanadyl oxalate (equivalent to 6.4 g of V$_2$O$_5$) at 300°C until the proportion of total active material in the supported catalyst is 7 percent by weight. The outer phosphorus-free layer contains 6% by weight of V$_2$O$_5$ and 94 percent by weight of TiO$_2$.

When o-xylene of 98% purity is reacted as described in Example 1 in the presence of this catalyst the loading of the air with o-xylene can be increased in twenty-eight hours to 40 g of o-xylene per cubic meter (STP). At a salt bath temperature of 399°C the maximum temperature in the catalyst bed does not exceed 480°C. Pure phthalic anhydride is obtained in a yield of 110% by weight.

We claim:

1. A multi-layer catalyst for the oxidation of aromatic or unsaturated aliphatic hydrocarbons consisting of an inert carrier in spherical form having a diameter of from 4 to 12 mm. to which there is applied at least two layers of a catalytically active material of a total thickness of from 0.02 to 2 mm., said active material consisting essentially of
   a. from 60 to 99 percent by weight of titanium dioxide and/or zirconium dioxide,
   b. from 1 to 40 percent by weight of vanadium pentoxide and
   c. based on the total amount of titanium dioxide, zirconium dioxide and vanadium pentoxide, up to 6% by weight of phosphorus in the form of a phosphorus compound, wherein the catalytically active material in the outer layer of the catalyst contains from 0 to 0.3 percent by weight of phosphorus while the remainder of said active material contains more than 0.3 percent up to 6 percent by weight of phosphorus, the amount of the outer layer of the catalytically active material which contains from 0 to 0.3 percent by weight of phosphorus being not more than half of the total amount of said active material.

2. A catalyst as claimed in claim 1 wherein the catalytically active material in the outer layer contains from 0 to 0.25 percent by weight of phosphorus and the remainder of the catalytic material contains from 0.35 to 6 percent by weight of phosphorus.

3. A catalyst as claimed in claim 1 wherein the thickness of the outer layer of said catalytically active material is about 0.01 to 1 mm.

4. A catalyst as claimed in claim 1 wherein the catalytically active material in the inner layer contains from 60 to 94 percent by weight of titanium dioxide and/or zirconium dioxide, from 6 to 40 percent by weight of vanadium pentoxide and, based on the total amount of titanium dioxide, zirconium dioxide and vanadium pentoxide, more than 0.3 up to 6 percent by weight of phosphorus and in the outer layer contains from 85 to 99 percent by weight of titanium dioxide and/or zirconium dioxide, from 1 to 15 percent by weight of vanadium pentoxide and, based on the total amount of titanium dioxide, zirconium dioxide and vanadium pentoxide, from 0 to 0.3 percent by weight of phosphorus.

5. A catalyst as claimed in claim 1 in which there are two layers of said catalytically active material.

6. A catalyst as claimed in claim 1 in which there are three layers of said catalytically active material.

7. A catalyst as claimed in claim 1 wherein said inert carrir has an internal surface area of from 0 to 3 m$^2$/g.

8. A catalyst as claimed in claim 7 wherein said inert carrier consists essentially of a material selected from the group consisting of quartz, porcelain, fused aluminum oxide, silicon carbide and fused or sintered silicates.

9. A catalyst as claimed in claim 7 wherein the titanium dioxide is in the form of anatase having an internal surface area of 5 to 30 m$^2$/g and the zirconium dioxide has an internal surface area of 2 to 25 m$^2$/g, both oxides being used in finely divided form.

* * * * *